(12) United States Patent
Tiesler et al.

(10) Patent No.: US 7,249,873 B2
(45) Date of Patent: Jul. 31, 2007

(54) ADJUSTABLE LIGHT BEAM DEVICE FOR AIMABLE VEHICLE LAMP ASSEMBLY AND METHOD

(75) Inventors: John Marstan Tiesler, Harrison Township, MI (US); Shu-Hsiung Chou, Rochester Hills, MI (US); Christopher Paul Pattitoni, Northville, MI (US)

(73) Assignee: Lear Corporation, Southfield, MI (US)

( * ) Notice: Subject to any disclaimer, the term of this patent is extended or adjusted under 35 U.S.C. 154(b) by 219 days.

(21) Appl. No.: 10/935,618

(22) Filed: Sep. 7, 2004

(65) Prior Publication Data
US 2006/0050524 A1 Mar. 9, 2006

(51) Int. Cl.
*B60Q 3/02* (2006.01)
(52) U.S. Cl. ............ 362/488; 362/490; 362/523; 362/418; 362/652; 362/656
(58) Field of Classification Search ............ 362/260, 362/277, 285, 319, 418, 429, 430, 433, 490, 362/523, 167, 171, 174, 187, 196, 198, 488, 362/548, 549, 647, 652, 655, 656
See application file for complete search history.

(56) References Cited

U.S. PATENT DOCUMENTS

| | | | | |
|---|---|---|---|---|
| 2,536,799 | A * | 1/1951 | Divizia ................ | 362/484 |
| 4,298,912 | A * | 11/1981 | Dearth ................ | 362/490 |
| 4,802,069 | A * | 1/1989 | Chandler ............. | 362/506 |
| 5,070,434 | A * | 12/1991 | Suman et al. ........ | 362/490 |
| 5,307,246 | A | 4/1994 | Schmid et al. | |
| 5,412,548 | A * | 5/1995 | Yee .................. | 362/202 |
| 5,582,474 | A | 12/1996 | Van Order et al. | |
| 5,584,568 | A * | 12/1996 | Corbasson et al. .... | 362/268 |
| 5,595,435 | A * | 1/1997 | Palmer et al. ........ | 362/109 |
| 5,908,239 | A | 6/1999 | Sugimoto | |
| 5,938,321 | A | 8/1999 | Bos et al. | |
| 5,980,070 | A * | 11/1999 | Hulse et al. ......... | 362/385 |
| 6,015,219 | A | 1/2000 | Kelly | |
| 6,015,222 | A | 1/2000 | Schindler | |
| 6,155,700 | A | 12/2000 | Hsu | |
| 6,200,011 | B1 * | 3/2001 | Miller et al. ......... | 362/554 |
| 6,283,621 | B1 | 9/2001 | Macri | |
| 6,290,368 | B1 * | 9/2001 | Lehrer ............... | 362/187 |
| 6,471,378 | B1 | 10/2002 | Ziegerer et al. | |
| 6,527,416 | B1 * | 3/2003 | Reason et al. ....... | 362/259 |
| 6,550,948 | B1 | 4/2003 | Filbrun et al. | |
| 6,764,204 | B1 * | 7/2004 | Peters ............... | 362/429 |
| 6,942,363 | B1 * | 9/2005 | LeVasseur ........... | 362/277 |
| 2004/0017687 | A1 | 1/2004 | Misaras | |
| 2004/0070982 | A1 * | 4/2004 | Lagonegro .......... | 362/359 |
| 2005/0174791 | A1 * | 8/2005 | Bynum .............. | 362/490 |

FOREIGN PATENT DOCUMENTS

DE EP 1118501 * 7/2001

* cited by examiner

*Primary Examiner*—Thomas M. Sember
(74) *Attorney, Agent, or Firm*—Wildman, Harrold, Allen & Dixon LLP

(57) ABSTRACT

An adjustable light beam device for an aimable vehicle lamp assembly is provided. The adjustable light beam device includes a lamp housing having a channel member with an outer portion and an inner portion. A tube component is positioned within the interior portion of the channel member. The tube component is adjustably movable along the inner portion of the channel member.

17 Claims, 2 Drawing Sheets

ADJUSTABLE LIGHT BEAM DEVICE FOR AIMABLE VEHICLE LAMP ASSEMBLY AND METHOD

BACKGROUND OF THE INVENTION

1. Field of the Invention

The invention relates generally to vehicle lamp assemblies, and in particular, to vehicle lamp assemblies that are aimable to position a lamp which provides illumination in a designated area.

2. Background Art

Automotive vehicles use fixed and aimable lamp assemblies to provide light within the interior of a vehicle. Conventional aimable lamps have employed a trim bezel assembly which has been used to contain movement of components housing an interior lamp or light source. Other lamp assemblies turn a lens about a fixed light source to aim light coming from the light source. Such conventional assemblies often require a significant number of components resulting in increased packaging space requirements and increased costs. Additionally, conventional lamp assemblies have housing members positioned at fixed locations relative to a light source thereby limiting the ability to adjust the width of a light beam emanating from the light source through an opening of the housing.

SUMMARY OF THE INVENTION

An adjustable light beam device for an aimable vehicle lamp assembly is provided. The adjustable light beam device includes a lamp housing having a channel member with an outer portion and an inner portion. A tube component is positioned within the interior portion of the channel member. The tube component is adjustably movable along the inner portion of the channel member.

A method of adjusting a light beam diameter in a vehicle lamp assembly is also provided. The method comprises positioning a channel member, with an outer portion and an inner portion, of a lamp housing to be placed proximate to a light source capable of emitting a beam of light. A tube component is positioned within the inner portion of the channel member such that the tube component is able to be adjustably moved along the inner portion of the channel member. The diameter of the beam of light is varied as the tube component is moved along the inner portion of the channel.

DETAILED DESCRIPTION

Figure 1:
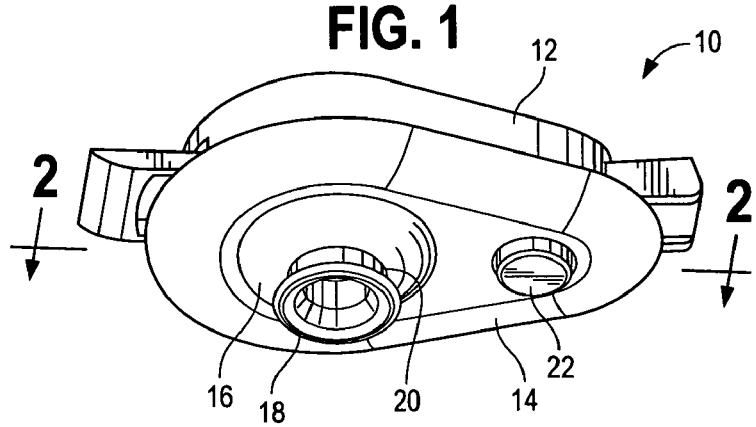
FIG. 1 is a perspective view of an aimable vehicle lamp assembly.
Figure 2:
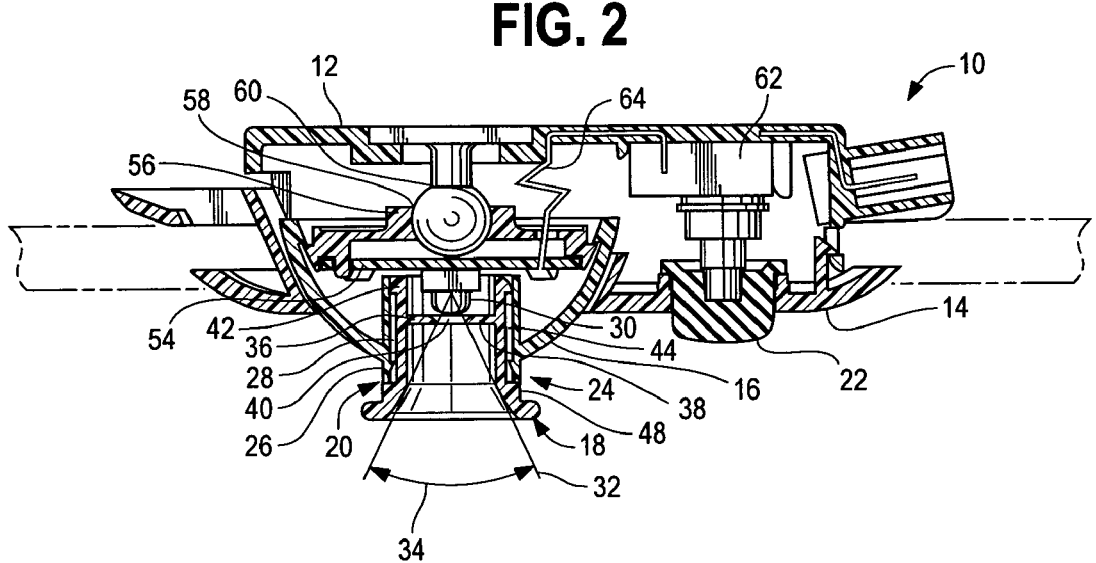
FIG. 2 is a cross sectional view of the aimable vehicle lamp assembly taken along lines 2-2 of FIG. 1.
Figure 3:
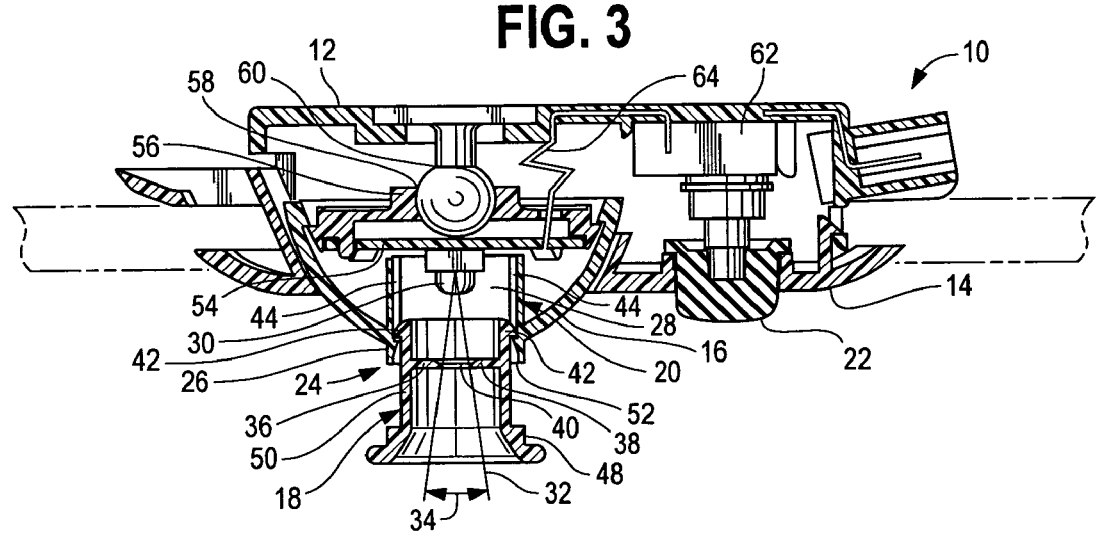
FIG. 3 is a cross sectional view of the aimable vehicle lamp assembly with a tube component moved to an extended position.

Referring now to FIG. 1, an aimable vehicle lamp assembly 10 is shown having a backplate 12 and a front bezel 14. Lamp housing 16 partially protrudes through the bezel 14. A movable tube component 18 is positioned within a channel member 20 of the lamp housing 16 which houses a light source that emits light through the tube component. Push button 22, partially extending through the front bezel 14, is connected to a switch unit which activates and deactivates the light source upon user actuation of the push button. The tube component 18 is able to be adjustably moved within the channel member 20 by sliding the tube component from a compact position (as seen in FIGS. 1 and 2) to a fully extended position (as seen in FIG. 3). The diameter of a beam of light projected from the tube component 18 is adjustably varied as the tube component is moved upwards and downwards in the lamp housing 16 such that the light beam has a relatively wide diameter when the tube component is placed in the compact position (FIGS. 1 and 2) and the light beam diameter progressively narrows as the tube component is moved to the extended position (FIG. 3).

Referring now to FIGS. 2 and 3, aimable vehicle lamp assembly 10 is shown with an adjustable light beam device 24 having channel member 20 and tube component 18 slidably moveable within the channel member 20. The channel member 20 extends inward of the lamp housing 16 and has an outer portion 26 and an inner portion 28. The channel member 20 is positioned proximate to and encloses light source 30, such as a light emitting diode (LED), capable of emitting a beam of light 32. The tube component 18 is positioned within the inner portion 28 of the channel member 20 such that the tube component is able to be adjustably moved along the inner portion 28 of the channel member. The diameter 34 of the beam of light 32 is selectively varied and adjusted as the tube component is moved along the inner portion of the channel 20.

A light clipping member 36, having a light blocking section 38 and a tapered hole 40, extends across an interior portion 28 of the tube component 18. The light clipping member 36 allows light emitting from the light source 30 to pass through the tapered hole 40 and concentrates the diameter of the beam of light 32. The light clipping member 36 is positioned in a central portion of the tube component 18 and is placed in close proximity to the light source 30 when the tube component is in a compact position, as seen in FIG. 2. In this position, as seen in FIG. 2, the light beam diameter 34 is relatively wide. As the tube component 18 is slidably moved outward (away from the light source) within the channel member 20 the light beam diameter 34 becomes more narrow.

As seen in FIG. 3, resilient snap members 42 of the tube component 18 are positioned into corresponding slots 44 formed in the inner portion 28 of the channel member 20. As the tube component 18 is moved away from the light source 30, the resilient snap members 42 are guided within the corresponding slots 44 until the snap members engage a blocking member 46 (such as a blocking wall) formed in the slots 44 to resist further movement of the tube component in the direction away from the light source. In the fully extended position, as seen in FIG. 3, the diameter of the beam of light 32 is narrowed and concentrated as light clipping member 36 is moved further away from light source. The utilization of the adjustable light beam device 24 in this embodiment, for example, may selectively allow adjustment of the light emitting angle to range from 16 degrees (in the extended position of FIG. 3) to 48 degrees (in the compact position of FIG. 2). The small diameter tapered hole 40 of the light clipping member 36 positioned within a central portion of the tube component 18 provides light passage. Raising and lowering the tapered hole 40 of the light clipping member 36 from the light source 30 causes the light beam diameter 34 to be clipped, resulting in a larger or smaller beam diameter at the target point. As seen in FIG. 2, the tube component 18 has a flange member 48 about the outer surface of the tube body 50. The flange member 48 is moved into abutment with an exterior end 52 of the channel member 20 to resist further movement of the tube component 18 into the channel member in the direction towards the light source 30.

The aimable vehicle lamp assembly 10, as seen in FIGS. 2 and 3, has light source 30 disposed between front bezel 14 and backplate 12. The light source 30 is coupled with a circuit board member 54 (such as an LED board) that is seated within a retainer member 56. Retainer member 56 has a socket 58 which engages a ball and post member 60 to permit swivel action of the lamp housing relative to the light source 30. A switch unit 62 is coupled to the light source board member 54 by wiring 64 and activates and deactivates light source 30 upon actuation of the push button 22 that extends through an opening of the bezel.

Referring now to FIGS. 4A, 4B, 5A and 5B, lamp housing 16 has a centrally positioned channel member 20, with an outer portion 26 and an inner portion 28, which receives the slidable tube component 18. Slots 44 are formed within the inner portion 28 of the channel member 20. Proximate one end of the tube component 18 are resilient snap members 42 which are positioned into corresponding slots 44 of the flanged channel member 20 for slidable movement along the inner portion 28 of the channel member.

Figure 4A:
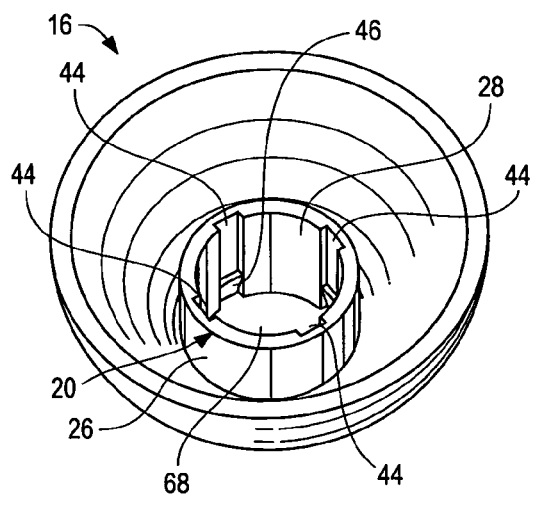
FIG. 4A is a bottom perspective view of a lamp housing.
Figure 4B:
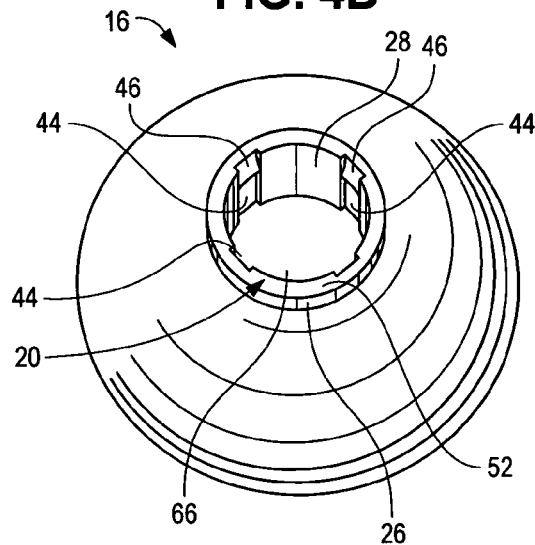
FIG. 4B is a top perspective view of the lamp housing.

As seen in FIGS. 4A and 4B, the slots 44 each have corresponding blocking members 46 which are positioned to engage with corresponding resilient snaps 42 moving within the slot. When the tube component 18 is moved to the fully extended positioned, as seen in FIG. 3, the resilient snaps 42 engage the blocking members 46 in the slots 44 to resist movement of the tube component from extending further away from the light source 30. In this embodiment, the channel member 20 has four slots 44 with four blocking members 46 that are substantially equally spaced apart from one another. The tube component 18, in this example, has four substantially equally spaced resilient snaps 42 which are positionable within the four corresponding slots 44 of the channel member 20. The channel member 20 has a hollow elongated configuration extending between a top opening 66 and a bottom opening 68 and the blocking members 46 horizontally extend across the corresponding slots 44 in a direction generally transverse to the top opening 66 and bottom opening 68 of the channel member 20.

Figure 5A:
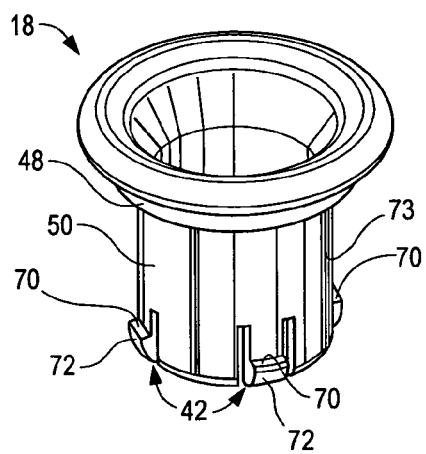
FIG. 5A is a top perspective view of a tube component.
Figure 5B:
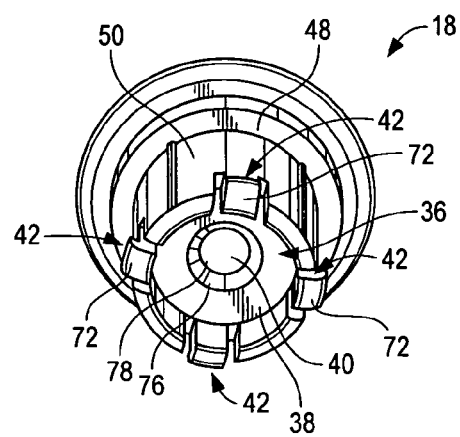
FIG. 5B is a bottom perspective view of the tube component.

The resilient snaps 42 (FIGS. 5A, 5B) each have a lateral extension portion 70 which extends outward from body 50 of tube component 18. The lateral extension portions 70 of the resilient snaps 42 are engagable with the blocking members 46 formed in the slots 44 of the channel member 20 to resist further movement of the tube component away from the light source 30 and to keep the tube component from being disengaged or separated from the channel member 20. In this example, the resilient snaps 42 have an arched portion 72 extending down from the lateral extension portion 70 to an end of the tube component 18. A number of rib members 73 are formed on an outer wall 74 of the tube component 18 to provide a tight fit of the tube component with the inner portion 28 of the channel member. As seen in FIGS. 5A and 5B, the tube component 18 has a flanged section 48 which is used to resist slidable movement of the tube component in a direction towards the light source 30 (See FIG. 2) upon abutment of the flanged section 48 with an end 52 of the channel member 20. Light clipping member 36 of the tube component 18 has a tapered hole 40 extending from a wide opening 76 to a narrow opening 78 to clip and permit passage of light through the tube component.

In an alternative embodiment, the tube component is raised and lowered relative to the lamp housing by applying rotational movement to the tube component. In this example, thread members (not shown) are formed on the inner portion of the channel member for mating engagement with thread members (not shown) formed on the outer body portion of the tube component. The tube component, in this example, is able to move within the channel member upon rotational movement of the tube component.

The foregoing description of the various embodiments of the invention have been presented for purposes of illustration and description, and are not intended to be exhaustive or to limit the invention to the precise forms disclosed. The descriptions were selected to best explain the principles of the invention and their practical application to enable other skills in the art to best utilize the invention in various embodiments and various modifications as are suited to the particular use contemplated. It is intended that the scope of the invention not be limited by the specification, but be defined by the claims set forth below.

What is claimed is:

1. An adjustable light beam device for an aimable vehicle lamp assembly, comprising:

a lamp housing having a channel member with an outer portion and an inner portion, the inner portion of the channel member having at least one slot formed therein;

a light source disposed within the lamp housing;

a tube component positioned within and movable along the inner portion of the channel member such that the light source projects light through the tube and the position of the tube is adjustable in relation to the light source, the tube comprising a first end located proximate the light source and second end located distal from the light source;

a wall extending across an interior portion of the tube component and having an aperture formed therein such that the light source projects light through the aperture, the wall being positioned spaced apart from the second end of the tube component such that a portion of the tube component extends between the wall and the second end; and at least one resilient snap member formed on the tube component, the resilient snap member being positioned within the at least one slot of the channel member.

2. The adjustable light beam device of claim 1 further comprising at least one blocking member formed in the inner portion of the channel member such that the blocking member is positioned for engagement with the resilient snap member to resist movement of the tube component in one direction.

3. The adjustable light beam device of claim 2 wherein the channel member has a hollow elongated configuration extending between a top opening and a bottom opening and wherein the at least one blocking member horizontally extends across the slot and is transverse to the top and bottom opening of the channel member.

4. The adjustable light beam device of claim 2 wherein the tube component has a flanged section to resist slidable movement of the tube component in another direction upon abutement of the flanged section with one end of the chanel memeber.

5. The adjustable light beam device of claim 1 wherein the at least one slot includes a plurality of slots formed within the inner portion of the channel member and wherein the at least one resilient snap member includes a plurality of resilient snap members which are correspondingly positionable into the slots for slidable movement along the inner portion of the channel member.

6. The adjustable light beam device of claim 5 further comprising a plurality of blocking members correspondingly formed in the plurality of slots such that the blocking members are positioned to engage with a corresponding one of the plurality of resilient snaps to resist movement of the tube component in one direction.

7. The adjustable light beam device of claim 6 wherein the plurality of blocking members are substantially equally spaced apart from one another and the resilient snaps are substantially equally spaced apart from one another.

8. The adjustable light beam device of claim 6 wherein each of the plurality of blocking members horizontally extends across a width of a corresponding one of the plurality of slots.

9. The adjustable light beam device of claim 8 wherein the resilient snaps have a lateral extension portion which extends outward from a body of the tube component such that the lateral extension portions of the snaps are correspondingly engageable with the blocking members formed in the slots of the channel member to resist movement of the tube component in the one direction.

10. The adjustable light beam device of claim 9 wherein the resilient snaps further comprise an arched portion extending down from the lateral extension portion to a bottom end of the tube component.

11. The adjustable light beam device of claim 6 further comprising a plurality of rib members on an outer wall of the tube component to provide a tight fit with the inner portion of the channel member.

12. The adjustable light beam device of claim 11 wherein the tube component further comprises a flanged section to resist slidable movement of the tube component in another direction upon abutment with one end of the channel member.

13. The adjustable light beam device of claim 11 wherein the tube component further comprises a light clipping member extending across an interior portion of the tube component, and wherein the light clipping member includes a tapered hole extending from a wide opening to a narrow opening.

14. A method of adjusting a light beam diameter in a vehicle lamp assembly, comprising the steps of:
    positioning a channel member, with an outer portion and an inner portion, of a lamp housing proximate to a light source capable of emitting a beam of light;
    positioning a tube component within the inner portion of the channel member such that the tube component is able to be adjustably moved along the inner portion of the channel member, the tube component having a first end positioned proximate the light source and a second end positioned distal from the light source;
    providing a wall within the interior portion of the tube component, having an aperture formed therein such that the light source projects the beam of light through the aperture;
    positioning the wall spaced apart from the second end of the tube component such that a portion of the tube component extends between the wall and the second end;
    positioning a plurality of resilient snap members of the tube component into corresponding slots formed in the inner portion of the channel member;
    slidably moving the resilient snap members along the corresponding slots; and
    varying a diameter of the beam of light as the tube component is moved along the inner portion of the channel.

15. The method of claim 14 further comprising the step of:
    engaging the resilient snap members of the tube component with corresponding blocking members formed in the slots to resist movement of the tube component in one direction.

16. The method of claim 15 farther comprising moving a flange member of the tube component to abut with an end of the channel member to resist movement of the tube component in another direction.

17. The method of claim 16 farther comprising providing a light clipping member, having a light blocking section and a tapered hole, to extend across an interior portion of the tube component.

* * * * *